US008752129B1

(12) United States Patent
Alten

(10) Patent No.: US 8,752,129 B1
(45) Date of Patent: Jun. 10, 2014

(54) SYSTEMS AND METHODS FOR A SELF-DEFENDING WIRELESS COMPUTER NETWORK

(76) Inventor: Alex I. Alten, Pleasanton, CA (US)

( * ) Notice: Subject to any disclaimer, the term of this patent is extended or adjusted under 35 U.S.C. 154(b) by 1478 days.

(21) Appl. No.: 11/248,848

(22) Filed: Oct. 12, 2005

Related U.S. Application Data

(60) Provisional application No. 60/617,979, filed on Oct. 12, 2004.

(51) Int. Cl.
*H04L 29/06* (2006.01)
(52) U.S. Cl.
USPC .................... 726/3; 726/12; 726/14; 380/270
(58) Field of Classification Search
CPC ............................ H04L 63/08; H04L 63/0281
USPC .................... 726/12, 14, 3; 380/270
See application file for complete search history.

(56) References Cited

U.S. PATENT DOCUMENTS

| 6,262,988 | B1 * | 7/2001 | Vig | 370/401 |
|---|---|---|---|---|
| 6,418,129 | B1 * | 7/2002 | Fingerhut | 370/328 |
| 6,643,274 | B2 * | 11/2003 | D'Annunzio | 370/316 |
| 6,822,955 | B1 * | 11/2004 | Brothers et al. | 370/389 |
| 6,971,005 | B1 * | 11/2005 | Henry et al. | 713/155 |
| 7,020,718 | B2 * | 3/2006 | Brawn et al. | 709/238 |
| 7,120,438 | B2 * | 10/2006 | Omar et al. | 455/435.1 |
| 7,159,149 | B2 * | 1/2007 | Spiegel et al. | 714/43 |
| 7,289,518 | B2 * | 10/2007 | Huckins | 370/395.54 |
| 7,461,404 | B2 * | 12/2008 | Dudfield et al. | 726/25 |
| 2004/0100934 | A1 * | 5/2004 | Kachi | 370/338 |
| 2004/0240474 | A1 * | 12/2004 | Fan | 370/475 |
| 2006/0002324 | A1 * | 1/2006 | Babbar et al. | 370/325 |

OTHER PUBLICATIONS

RFC:1918, Address Allocation for Private Internets, Rekhter et al., Feb. 1996.*
"Dynamic Host Configuration Protocol (DHCP) Services", Jan. 2007, retrieved from http://userpages.umbc.edu/~dgorin1/451/OSI7/dhcp.html.*

* cited by examiner

*Primary Examiner* — Mohammad L Rahman
(74) *Attorney, Agent, or Firm* — James M. Wu; JW Law Group

(57) ABSTRACT

In one embodiment, the methods and apparatuses to assign a routing address to a wireless computer that is in a different logical network from the routing addresses of other wireless computers within the same physical wireless network; and to prevent a wireless computer from learning the routing address of another wireless computer within the same physical wireless network.

12 Claims, 2 Drawing Sheets

SYSTEMS AND METHODS FOR A SELF-DEFENDING WIRELESS COMPUTER NETWORK

CROSS REFERENCE TO RELATED APPLICATIONS

The present application claims benefit of U.S. Provisional Patent Application No. 60/617,979 filed on Oct. 12, 2004, entitled "Systems and Methods for a Self-Defending Computer Network" listing the same inventor, the disclosure of which is hereby incorporated by reference.

FIELD OF THE INVENTION

This invention is related to a self defending computer network in general, and in particular a self-defending wireless computer network.

BACKGROUND OF THE INVENTION

There are a variety of ways that a computer can be attacked to compromise the computer's functionality. For example, viruses and worms are common attacks that are utilized to hinder the functionality of a computer. To counterbalance these attacks, there have been a proliferation in computer anti-virus software applications that attempt to identify the virus or worm and neutralize the threat of the virus or worm spreading from a local computer to another computer.

SUMMARY OF THE INVENTION

In one embodiment, the methods and apparatuses to assign a routing address to a wireless computer that is in a different logical network from the routing addresses of other wireless computers within the same physical wireless network; and to prevent a wireless computer from learning the routing address of another wireless computer within the same physical wireless network.

DETAILED DESCRIPTION OF THE INVENTION

Specific reference is made in detail to the embodiments of the invention, examples of which are illustrated in the accompanying drawings and following descriptions. While the invention is described in conjunction with the embodiments, it will be understood that the embodiments are not intended to limit the scope of the invention. The various embodiments are intended to illustrate the invention in different applications. Further, specific details are set forth in the embodiments for exemplary purposes and are not intended to limit the scope of the invention. In other instances, well-known methods, procedures, and components have not been to described in detail as not to unnecessarily obscure aspects of the invention.

Figure 1:
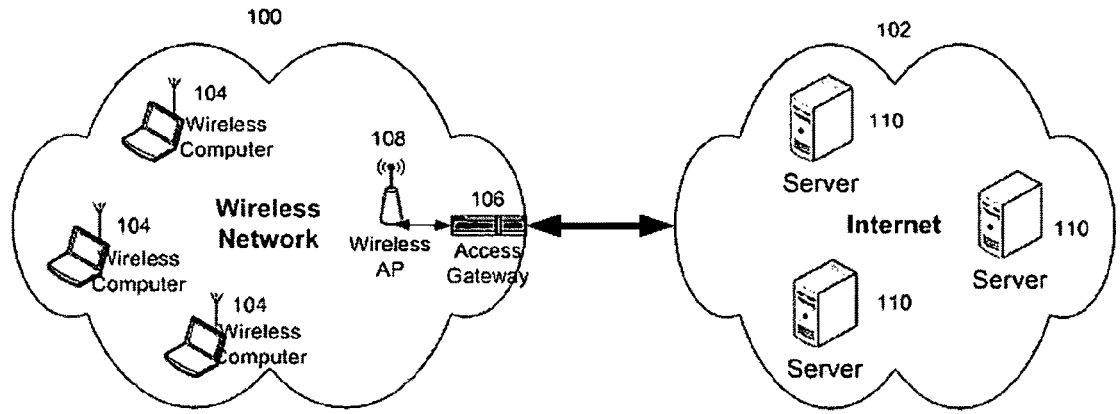
FIG. 1 depicts a diagram illustrating one embodiment of a Wireless Network with Wireless Computers, an Access Gateway and Internet Servers.

Referring to FIG. 1, this illustrates wireless computer network (100), such as an IEEE 802.11 based one, with a connection to the Internet (102) via an Access Gateway (106). In one embodiment, the wireless computers (104) are mobile and may enter and leave the wireless computer network at anytime. They also may access various Servers (110) out on the Internet (102) or on a corporate wired Intranet.

Figure 2:
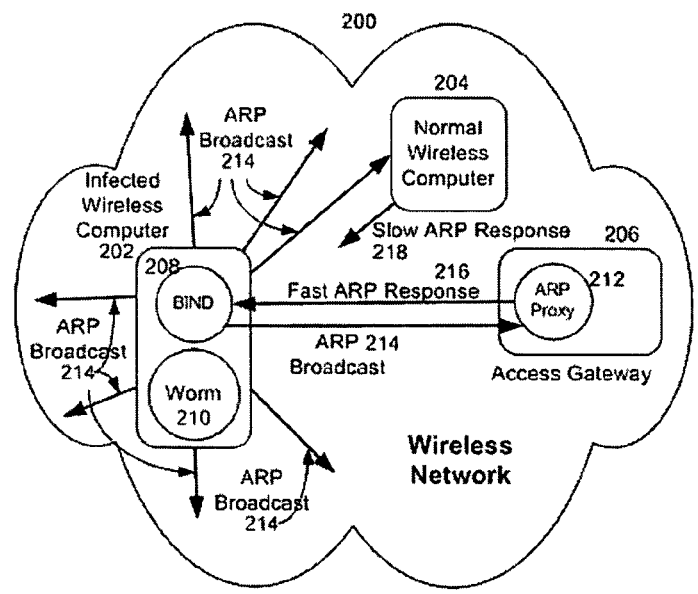
FIG. 2 depicts a diagram illustrating one embodiment of the Address Resolution Protocol (ARP) communications between Wireless Computers and the ARP Proxy software module on the Access Gateway.

Referring to FIG. 2, this illustrates a Wireless Network (200) with a Wireless Computer A (202) that has been infected with a network aware virus (210), or Internet worm, that is actively trying to find another Wireless Computer (204) to infect. In one embodiment, the worm or virus (210) instructs the Wireless Computer A's BIND (ARP Client) software (208) to issue a series of ARP broadcasts (214) to resolve addresses within a network that are assigned to the Wireless Network (200). In one embodiment, these series of addresses are from the lowest to highest host address possible with an Internet Class address. For example the network address 84.55.0.0 has 16 bits used for host addresses, which range from 84.55.0.1 to 84.55.255.254, and has more than 64,000 addresses.

In one embodiment, the Access Gateway (206) has a high-performance ARP Proxy (212) that can respond quicker than Wireless Computer B's ARP response packet (218). The ARP Proxy issues a fast ARP response binding the Access Gateway's own MAC address with the IP address the worm is seeking. Thus, the Wireless Computer A's TCP/IP stack never learns Wireless Computers B's MAC address. The Access Gateway (206) is robust in the face of a subsequent attack by the worm or virus.

Figure 3:
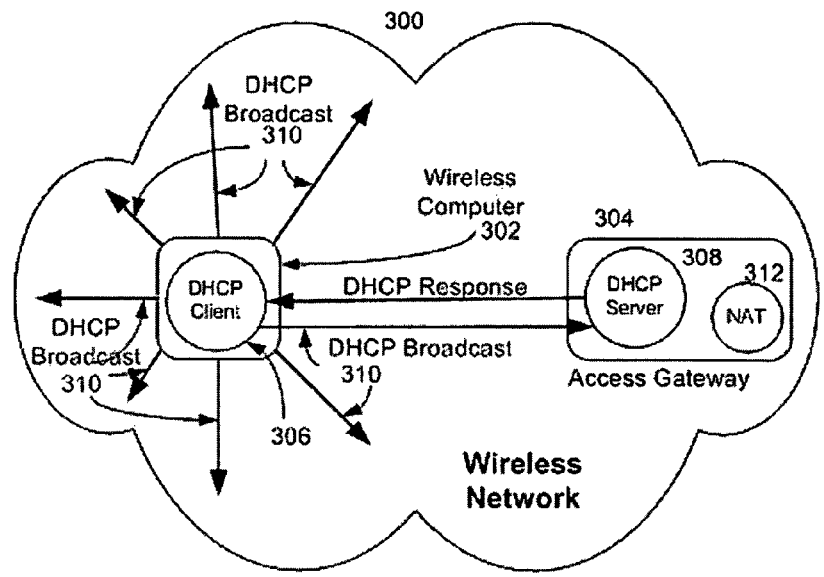
FIG. 3 depicts a diagram illustrating one embodiment of the Dynamic Host Control Protocol (DHCP) communications between a Wireless Computer and a DHCP Server software module on the Access Gateway.

Referring to FIG. 3, this illustrates the Wireless Network (300) with a Wireless Computer (302) that has either just roamed into the network or has been restarted. The DHCP Client (306) within the Wireless Computer (302) periodically transmits a DHCP broadcast packet (310) requesting it's own IP address and the IP address of a gateway. The Access Gateway (304) contains a DHCP Server (308) that will respond with a DHCP response packet containing the new IP address of the Wireless Computer (302) and the Access Gateway's address for a routing gateway. The new IP address is put into a random network or subnet that doesn't already have an address assigned to another Wireless Computer. NAT software (312) running on the Access Gateway (304) will need to handle these addresses appropriately if IP packets must route outside of the Wireless Network (300). If the Wireless Computer (302) is infected with a worm, the Wireless Computer (302) is isolated from other Wireless Computers by virtue of the fact it is in it's own Internet network (or subnet). An attempt to contact an address outside of the range of addresses assigned to the network address will cause packets to be sent to the Access Gateway (304) where appropriate action can be taken to prevent the virus from spreading.

Figure 4:
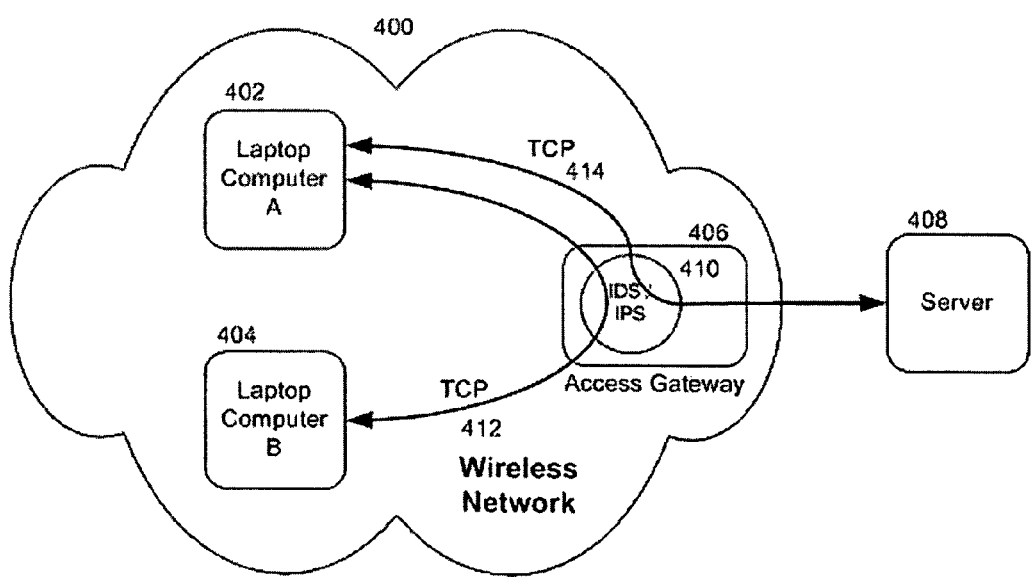
FIG. 4 depicts a diagram illustrating one embodiment of the Transmission Control Protocol (TCP) communications between Wireless Computers, between a Wireless Computer and an Internet Server.

Referring to FIG. 4, this illustrates the Wireless Network (400) with a Wireless Computer A (402) communicating via TCP (412) to Wireless Computer B (404) via the Access Gateway (406) and it's IDS/IPS software (410). Wireless Computer A can also communicate via TCP (414) through the Access Gateway and via it's IDS/IPS module to an external Server (408).

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are is possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A method for facilitating network communication between a plurality of computers and access gateways via wireless communication protocols, comprising;
   broadcasting a request message coded in address resolution protocol ("ARP") from a first wireless computer via a connected wireless network for seeking an Internet Protocol ("IP") address of a second wireless computer within the wireless network;
   receiving the request message by an access gateway ("AG") situated in the wireless network and activating a high-performance ARP proxy of AG in response to the request message, wherein activating the high-performance ARP proxy of AG includes initiating a fast response capability that responds messages quicker than other wireless computers within the wireless network; and
   transmitting a response message containing AG's address by the high-performance ARP proxy from the AG to the first wireless computer to establish the AG as a gateway for handling subsequent network communication relating to the first wireless computer; wherein the response message contains the network identification based on a random value, wherein transmitting a response message containing AG's address includes preventing computer virus initiated from the first wireless computer from spreading by the AG.

2. The method according to claim 1,
   wherein the request message is a Dynamic Host Control Protocol (DHCP) message;
   wherein the first wireless computer is a DHCP client;
   wherein the access gateway is a DHCP server;
   wherein the first wireless computer broadcasts a DHCP message with an IP address request; and
   wherein the access gateway transmits a DHCP message with an IP address lease acknowledgement response.

3. The method according to claim 1, wherein the response message contains IP address from 84.55.0.1 to 84.55.255.254; and wherein the network identification is unique with 64,000 possible values.

4. The method according to claim 1, wherein the response message contains IP address from lowest to highest of host address.

5. A method for facilitating network communication between a plurality of computers and access gateways via wireless communication protocols, comprising;
   detecting by an access gateway ("AG") a plurality of address resolution protocol ("ARP") request messages broadcasted from a first wireless computer via a connected wireless network for finding Internet Protocol ("IP") addresses of a plurality of other wireless computers within the wireless network;
   activating a high-performance ARP proxy of AG having a capability of providing responses quicker than responses generated by other wireless computers within the wireless network in response to the plurality of ARP request messages;
   generating a plurality of fast ARP responses with AG IP addresses by the AG in accordance with the plurality of ARP request messages; and
   transmitting the plurality of fast ARP responses containing AG's address by the high-performance ARP proxy from the AG to the first wireless computer to establish the AG as a gateway for handling subsequent network communication for the first wireless computer; wherein the responses contain the subnet number based on a random value; wherein transmitting the plurality of fast ARP responses includes spreading computer virus initiated by the first wireless computer and preventing the computer virus from infecting other wireless computers by the AG.

6. The method according to claim 5,
   wherein the ARP request messages are Dynamic Host Control Protocol (DHCP) messages;
   wherein the first wireless computer is a DHCP client;
   wherein the access gateway is a DHCP server;
   wherein the wireless computer broadcasts a DHCP message with an IP address and subnet mask option request;
   wherein the access gateway transmits a DHCP message with an IP address and subnet mask lease acknowledgement response.

7. The method according to claim 5,
   wherein each of the plurality of fast ARP responses contains an IP address which has a range from 84.55.0.0 to 84.55.255.254.

8. The method according to claim 7,
   wherein each of the plurality of fast ARP responses contains an IP address having a range from lowest of a subnet number to highest subnet number of a host.

9. The method according to claim 5, wherein spreading computer virus includes distributing computer worm to various wireless computers within the wireless network.

10. The method according to claim 5, wherein transmitting the plurality of fast ARP responses containing AG's address by the high-performance ARP proxy includes reaching to the first wireless computer with the plurality of fast ARP responses prior to arrival of responses issued by other wireless computers.

11. The method according to claim 5, wherein the wireless network is a radio broadcast based WiFi network.

12. The method according to claim 5, wherein the wireless network is a radio broadcast based network.

* * * * *